April 7, 1936.  H. W. LAW  2,036,706
FROZEN CONFECTION
Filed Dec. 3, 1934
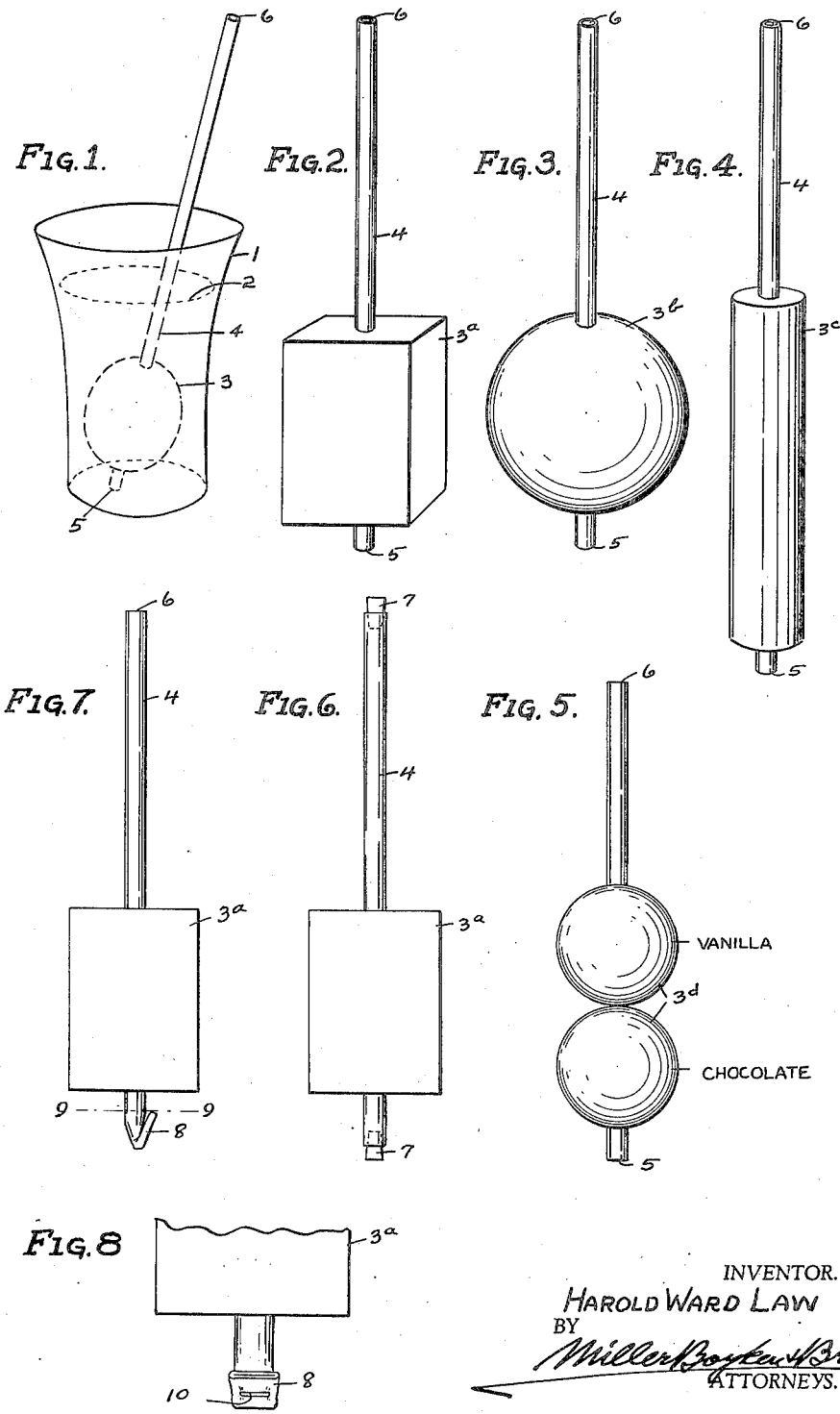
INVENTOR.
HAROLD WARD LAW
BY
Miller Boyken & Bried
ATTORNEYS.

Patented Apr. 7, 1936

2,036,706

UNITED STATES PATENT OFFICE 2,036,706

FROZEN CONFECTION

Harold Ward Law, San Francisco, Calif.

Application December 3, 1934, Serial No. 755,657

6 Claims. (Cl. 99—137)

This invention relates to frozen confections such as ices and ice creams, and has for its object an improvement in that type of confection which is frozen on a stick, similar to the "sucker" type of candies for children. The principal object of my improvement is to provide a new article of manufacture comprising a block or lump of frozen confection with a straw projecting therethrough and frozen thereto, whereby the frozen confection may be lowered into a glass of beverage to cool or flavor the same and the beverage sucked through the straw. Other objects and advantages of the invention will appear in the following description and accompanying drawing.

In the drawing, Fig. 1 shows an ordinary tumbler or drinking glass containing a beverage and one of my improved frozen confection devices immersed therein.

Fig. 2 is a perspective view showing a rectangular block of ice cream or ice frozen to a straw in accordance with my invention.

Fig. 3 is similar to Fig. 2 but shows the frozen confection in the shape of a ball.

Fig. 4 is similar to Fig. 2 but shows the frozen confection in the shape of a cylinder.

Fig. 5 is similar to Fig. 2 but shows the frozen confection in the shape of a dumb-bell.

Fig. 6 shows the frozen confection on a straw but with both ends of the straw plugged.

Fig. 7 is a view similar to that of Fig. 6 but shows the lower end of the straw flattened and folded over so as to close it.

Fig. 8 shows the lower end of my improved confection with the straw flattened and doubled upon itself and secured in closed position by means of a small staple.

Briefly described, the invention comprises freezing a block or lump of ice cream or water ice onto a straw and adjacent one end of the straw while providing means for keeping the hole or bore of the straw open from end to end and not choked with a block of hard frozen cream or ice, all so that the block or lump of confection may be lowered into a glass of beverage such as soda water, root beer, etc. and the beverage thereby made into an "ice cream soda" variety of drink ready for sucking through the straw, the serving of such drinks being thereby greatly simplified as well as rendered more sanitary as it avoids the usual mess attendant upon digging out the required ice cream from a container with a scoop usually kept in a jar of somewhat questionable water, etc. It is, of course, contemplated that a ready supply of the frozen devices be kept in a handy refrigerator, each separably wrapped, so that one is simply unwrapped and placed into the glass, either before or after drawing the soda.

In Fig. 1 the beverage serving glass is indicated at 1, the liquid therein 2, the frozen confection 3 on its straw 4 ready for stirring the liquid or sucking the same together with the melting confection, through the straw which is open at both ends 5 and 6. The "straw" may of course be either a natural or artificial one as usually made of paper.

In Figs. 2, 3, 4, and 5, the lumps of frozen material are respectively rectangular, globular, cylindrical, and double ball or dumb-bell form. In the latter case one of the balls may be of different flavor from the other, such as the chocolate and vanilla indicated on the drawing, or one may be water ice and the other ice cream. Also to be noted is that there may be several successive lumps of ice cream or ice or in alternation frozen on the straw if desired.

A feature of importance in connection with the invention is that since the paper straw as usually used has thin flexible walls, they are slightly compressed by the pressure set up at the moment of freezing so as to insure the mass against slipping off very easily, and if desired the straws may be roughened slightly along the portion to be covered by the frozen material.

The straws are frozen in place by supporting them in while projecting into suitable molds in which the cream or ice is shaped and frozen to the straw. This is not shown in the drawing as the required construction of the molds would be obvious when the form of the desired product was known, but since it is most important in connection with the present invention that the straws be freely open in their bore, the opposite ends of all straws may be plugged as with small corks 7, 7 as shown in Fig. 6, or frail paraffine plugs made by dipping the ends of the straws, or otherwise closed as by suitable small paper caps, not shown, the corks, plugs, or caps, to be removed just before serving the article for use, or the straw clipped off to remove the stoppage.

Instead of plugging the straw, it may have one or both of its ends collapsed and folded upon itself as at 8 in Fig. 7, the folded end to be finally clipped off as along the line 9—9 in Fig. 7 before serving. If desired, the flattened and folded end 8 of the straw may be secured against opening during the freezing process by means of little wire staples as at 10 in Fig. 8.

Instead of actually freezing the blocks of cream or water ice upon the straws, the straws may first be chilled and the blocks pressed on by means of a die or parting mold, using pressure enough to compress the straw slightly and make the mixture adhere thereto. The adherence of the cream block to the straw will be further assured if the straws are moistened before chilling so as to each carry a film of hard frozen adherent ice. If desired, loose supporting mandrels may be inserted into the straws before compressing the block of cream or ice thereon to prevent undue compression of the straws.

Various other modifications will readily suggest themselves in view of the above disclosure and objects of the invention.

Having thus described my improvement in frozen confection products, what I claim is:

1. A frozen confection comprising a straw with a hole therethrough, and a lump of normally liquid, frozen edible material in adherent relation to the straw adjacent one end thereof, said straw projecting through said material.

2. A frozen confection comprising a straw with a hole therethrough, and a lump of normally liquid, frozen edible material in adherent relation to the straw adjacent one end thereof and compressing the walls of said straw, said straw extending entirely through said edible material.

3. A plurality of lumps of frozen confection in tandem arrangement and provided with a hollow straw extending entirely through all of the said lumps and in adherent relation to said lumps.

4. A frozen confection comprising a straw with a hole therethrough, and a plurality of lumps of frozen edible material of different flavors respectively in adherent relation to the straw adjacent one end thereof.

5. A frozen confection comprising a hollow straw, a lump of frozen confection in adherent relation to the straw near one end of the same with the straw extending entirely through the frozen confection, and means closing said end of the hollow straw to maintain it empty and prevent ingress of ice, said means adapted for removal before use of the confection.

6. A confection device consisting of a hollow straw with a lump of frozen confection in adherent relation on the straw, with the straw extending entirely through the confection, and means closing both ends of the hollow straw to maintain it empty, said means being removable before use of the confection.

HAROLD WARD LAW.